March 15, 1927.  
P. JACKSON  
CLOSURE PLUG FOR PIPES  
Filed July 10, 1925
1,620,728
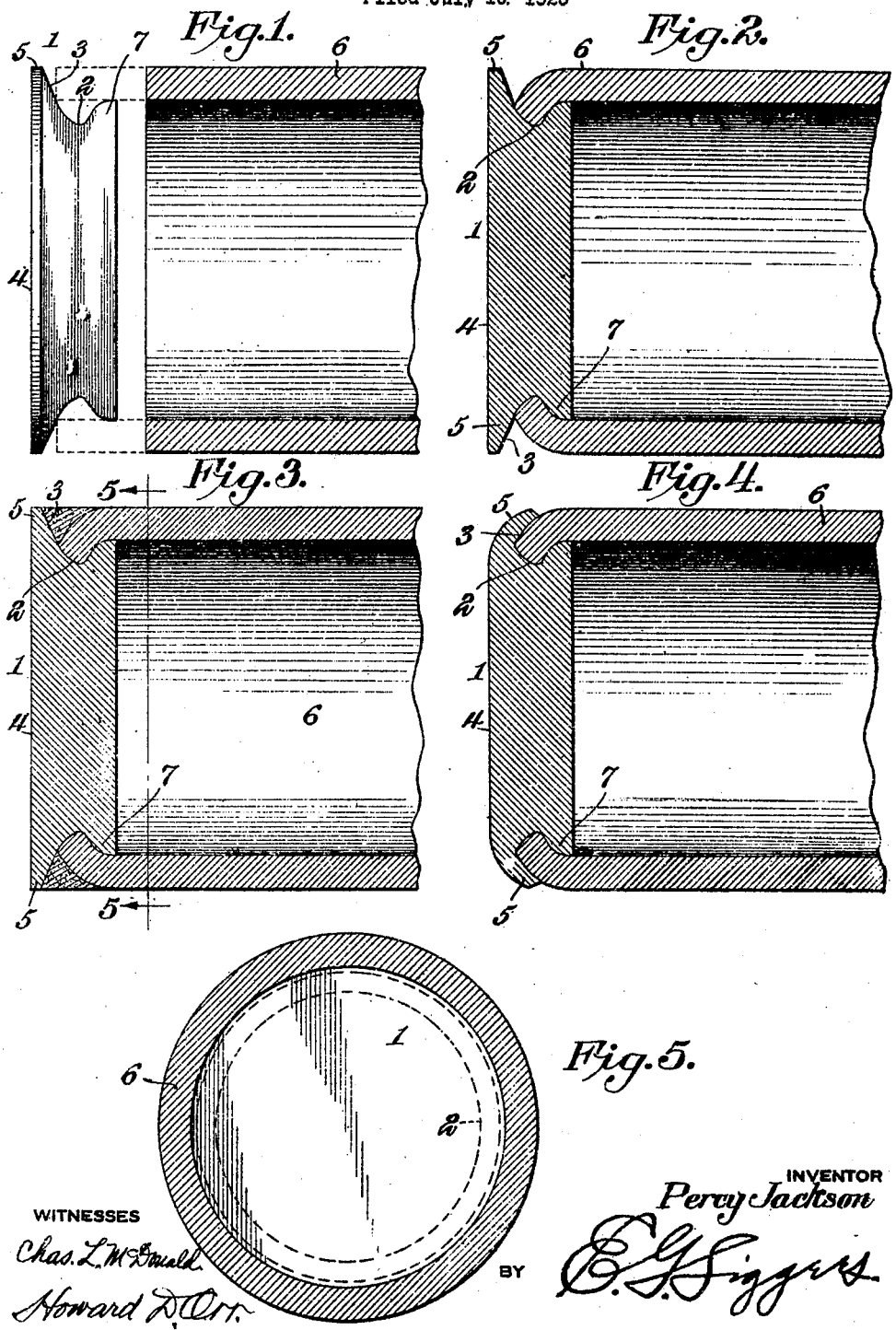

Patented Mar. 15, 1927.

1,620,728

UNITED STATES PATENT OFFICE.

PERCY JACKSON, OF CHATTANOOGA, TENNESSEE, ASSIGNOR TO WALSH & WEIDNER BOILER CO., OF CHATTANOOGA, TENNESSEE, A CORPORATION OF TENNESSEE.

CLOSURE PLUG FOR PIPES.

Application filed July 10, 1925. Serial No. 42,732.

This invention relates to closure plugs for pipes.

The object is to provide means for closing up the end of a pipe in a manner to effectually prevent leakage and to withstand the pressure therein, said means being confined within the pipe and occupying a minimum amount of space, the exterior of the same being substantially flush with the exterior of the pipe and having no projecting parts extending either radially or longitudinally beyond the flat end face of the closure.

Another object is to provide a closure shaped and proportioned to snugly fit the end of the pipe and having means for powerful and rigid connection therewith, without the necessity for using any separate or additional fastening devices, the end of the pipe being made to serve as connecting means, the closure being finally welded or peened over to seal the seam.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:—

Figure 1 is a side elevation of the improved closure shown in position to be inserted in the end of a pipe or tube;

Figure 2 is a similar view, the closure being shown in section and after being secured in the end of the pipe or tube;

Figure 3 is a view similar to Figure 2, the seam or joint between the closure and pipe or tube being welded;

Figure 4 is a view similar to Figure 3 but showing the exposed portion of the closure peened or turned over the end of the tube instead of welding the same; and Figure 5 is a transverse section taken on the line 5—5 of Figure 3.

The invention is designed for use in closing the ends of pipes or tubing whether round, square or of other cross-sectional form, and is especially adapted for use in connection with headers of water tube boilers, superheaters, economizers, etc., or for closing the ends of pipe in steam, gas or water lines, or for any other similar uses, the closure being so constructed as to be easily and cheaply manufactured from the proper metal and readily and quickly applied in rigid connection with the end of the tube to effectually prevent all leakage and withstand the pressure within said tube.

Referring to the drawing, 1 indicates a closure block or plug in the form of a disc composed of suitable metal having a peripheral shape conforming to the cross sectional shape of the pipe or tube to be closed. The thickness of said disc depends on the size or diameter of the tube, and the same is imperforate to provide the required strength, though it may of course be provided with suitable outlet opening or openings for the threaded or other connection of pipes or tubing of smaller diameter, where it is desired to connect supply pipes thereto.

The plug 1 is provided with a peripheral groove 2 extending entirely around the same and having a rounded bottom, as clearly shown in the drawing. The bottom of the groove is substantially midway between the opposite faces of the disc or plug, and one side wall 3 of the groove extends at an angle towards what constitutes the outer face 4 of the disc, to the outer periphery of the same, and defines a relatively thin, tapered flange 5 which is adapted to abut against the end of the tube 6, as indicated in dotted lines in Figure 1 of the drawing.

The outer periphery of the flange 5 is shaped to conform to the outer diameter of the tube to be plugged or closed, while that portion of the closure at the opposite or inner side of the central channel is of smaller diameter and is rounded on its inner corner to merge into the rounded bottom of the channel or groove 2, the said portion constituting an annular bead 7 having a diameter to snugly fit within the open end of the tube and to slide thereinto until the said end contacts with the inner inclined face of the aforesaid flange 5.

With the closure thus applied, as indicated in dotted lines in Figure 1 of the drawing, the end portion of the tube overlies the channel or groove 2 and, with the aid of a suitable press and suitable dies, the said end may be crimped or pressed inwardly to completely fill the said groove or channel entirely around the tube, the said inclined inner face of the tapered flange 5, as well as the rounded bottom of the channel serving to facilitate such action while the closure is being rigidly held in the tube with the end of the latter engaging the flange 5.

The bending of the end of the tube causes the same to follow the curved forward side of the inner bead 7 so as to eliminate or avoid all spaces, cracks or crevices between the contacting parts of the tube and the closure, the end edge of the tube even being forced to assume the contour of the front part of the rounded channel, as clearly shown in Figure 2 of the drawing.

The V-shaped space 8 thus formed between the inclined rear face of the front flange 5 and the forward, rounded surface 9 of the inturned end of the tube is preferably closed, as shown at 10 in Figure 3, by any practical form of welding which thus effectually closes all openings and avoids any possible chance for leakage, the principal portion of the strain of the pressure within the pipe, when in use, being taken care of by the powerful joint formed between the pipe and the closure through the inturned end being in engagement in the channel.

In lieu of welding the said joint in the V-shaped space 8, as described, the same may be closed to form a joint sufficiently tight to withstand all ordinary pressures, by simply bending or peening in the exposed portion of the flange 5 to cause the latter to extend rearwardly and to closely hug the outer rounded face of the inturned end of the tube, as shown in Figure 4 of the drawing. This is a simple and less expensive manner of finishing the joint and will serve advantageously in a great many instances.

From the foregoing it will be seen that a simple and cheaply manufactured closure has been provided for connection with ends of pipes or tubes, which may be produced by a very simple operation and which may be readily and quickly applied in position without the necessity for any separate fastening means, the said closure being readily adaptable to different sizes of pipes, whether the latter be of round, square or other cross-sectional shape, and when once applied in position, the permanency and rigidity of the closure is assured without danger of leakage under the pressure of gas, steam or water, the closure being as strong, if not stronger, than the pipe or tube itself.

What is claimed is:—

1. A closure plug for tube ends and the like comprising a disc-like metal block of substantial thickness having a V-shaped annular groove around its edge, said groove having a rounded portion and having side walls of different inclinations to the plane of the disc thereby to provide one flange to engage the end of the tube and another flange of smaller dimension to fit in the tube, the rounded portion of the groove providing an anvil against which the end of a tube may be crimped.

2. A closure plug for tube ends comprising a disc-like metal block of substantial thickness having a V-shaped groove around its edge midway between the sides thereof, providing two flanges, the inclination of one face of the groove with respect to the plane of the disc being greater than that of the other and its outer edge merging into one side of the disc, the depth of the groove being such as to make the difference between the maximum diameters of the flanges correspond substantially to the thickness of the tube whereby one flange may be inserted within the tube and the other will provide a stop shoulder for the tube end, the tube end adapted to be crimped and secured within the groove to produce a water-tight and gas-tight seal.

In testimony that I claim the foregoing as my own, I have hereto affixed my signature.

PERCY JACKSON.